(12) United States Patent
Tano

(10) Patent No.: US 6,439,723 B1
(45) Date of Patent: Aug. 27, 2002

(54) ORNAMENTAL IMAGE DISPLAY AND SOUND DEVICE

(76) Inventor: Robert S. Tano, 4725 Dorsey Hall Dr., Ellicott City, MD (US) 21042

( * ) Notice: Subject to any disclaimer, the term of this patent is extended or adjusted under 35 U.S.C. 154(b) by 0 days.

(21) Appl. No.: 09/522,492

(22) Filed: Mar. 10, 2000

Related U.S. Application Data

(60) Provisional application No. 60/124,377, filed on Mar. 15, 1999.

(51) Int. Cl.$^7$ .............................................. G03B 21/00
(52) U.S. Cl. ........................... 353/15; 353/74; 434/311
(58) Field of Search .............................. 353/15, 18, 19, 353/43, 28, 74, 77; 434/308, 310, 311, 314; 362/806, 807, 808, 809, 810, 811

(56) References Cited

U.S. PATENT DOCUMENTS

| | | | | |
|---|---|---|---|---|
| 3,691,312 A | * | 9/1972 | Petersen ..................... | 40/28.1 |
| 4,756,615 A | * | 7/1988 | Hildebrand .................. | 353/74 |
| 4,835,556 A | * | 5/1989 | Spector ....................... | 353/15 |
| 4,839,749 A | | 6/1989 | Franklin | |
| 4,951,203 A | | 8/1990 | Halamka | |
| 5,278,662 A | | 1/1994 | Womach et al. | |
| 5,378,512 A | * | 1/1995 | Vay Wyk ..................... | 428/11 |
| 5,541,680 A | * | 7/1996 | Fromm ........................ | 353/122 |
| 5,631,883 A | * | 5/1997 | Li ............................... | 434/317 |
| 5,648,753 A | | 7/1997 | Martin | |
| 5,959,281 A | * | 9/1999 | Domiteaux .................. | 235/454 |
| 6,285,472 B1 | * | 9/2001 | Odner et al. .................. | 359/1 |

* cited by examiner

Primary Examiner—William Dowling
(74) Attorney, Agent, or Firm—Law Offices of Royal W. Craig

(57) ABSTRACT

The present invention is an apparatus and method for presenting highly personal thoughts, sentiments, and engrams of a person in the form of a gift to a loved one. Feelings of an occasion or season are combined with a personal message through a representative embodiment of the season, for example, a Christmas ornament, having audio recording and image display devices therein. A simple photo transparency, such as a color slide, or other image storage device projects the donor's image onto a screen, either formed in a case of a predetermined theme, or onto a wall, thus allowing the donor to simply and easily incorporate his or her own image, and voice, in a personalized way.

19 Claims, 12 Drawing Sheets

ORNAMENTAL IMAGE DISPLAY AND SOUND DEVICE

CROSS-REFERENCE TO RELATED APPLICATIONS

The present application is based or U.S. Provisional Application No. 60/124,377 for "ORNAMENTAL PROJECTOR AND SOUND DEVICE"; Filed: Mar. 15, 1999.

BACKGROUND OF THE INVENTION

1. Field of the Invention

The present invention relates to an apparatus and method for visually and audibly presenting highly personal thoughts and engrams of a person as a gift to a loved one. The gift may be embodied in seasonal items, such as Christmas ornaments and Easter eggs, in jewelry, such as pendants, and other household keepsake items such as framed pictures, and employs a slide transparency for projecting an image.

2. Description of the Background

Often, the greatest gifts one can receive from a loved one are those in which a person gives to another something of a personal nature, thereby imparting a reminder of the loved one, forming a connection between the donor and the recipient. One such gift is a picture of the donor, particularly if it is accompanied with a personalized audio message directed toward the recipient. Although the present state of the an entails use of audio and video recordings, the prior an lacks a simple and inexpensive means of presenting a sentimental gift including personal engrams of the donor and pictures of the donor. Moreover, the prior art fails to reflect embodiments which combine such personal messages with themes associated with the season of the gift.

A variety of examples of structures adapted for various presentations includes U.S. Pat. No. 4,303,915 to D'Angelo et al. which describes a handheld alphanumeric display device.

U.S. Pat. No. 4,839,749 to Franklin describes a device having pre-recorded speech messages, triggerable from preset alarms.

U.S. Pat. No. 4,951,203 to Halamka describes a system for prerecording and transmitting personalized audio and video messages.

Others include U.S. Pat. No. 5,278,662 to Womach et al. describing a system for pre-recording personalized video messages capable of interweaving the message with separately pre-recorded background scenes.

U.S. Pat. No. 5,302,970 to Lakso et al. describes a personal communication device comprising a keyboard for use in transmitting alphameric data to remote screen.

U.S. Pat. No. 5,543,588 to Bisset et al. describes a personal communication device operated by a touch tone screen.

U.S. Pat. No. 5,594,462 to Fishman et al. describes a flexible raster control on a transmitted remote rasterized display.

Still others include U.S. Pat. No. 5,644,690 to Yoshino et al. describing a display system for assimilating a montage of facial, features into a hypothetical face.

U.S. Pat. No. 5,648,753 to Martin describes a portable sound effect player which plays prerecorded sounds which are stored on pre-record interchangeable plug in cartridges.

U.S. Pat. No. 5,648,760 to Kumar describes a portable recording and playback messaging and scheduling device with home base station.

U.S. Pat. No. 5,695,346 to Sekiguchi et al. describes a process for making video images using fresnel lenses so as to give the perception of movement.

An article in Electronics Review describes a single chip speech synthesizer capable of synthesizing digitized human speech and a QSI product brochure describes a hand held message display device.

Foreign publications include U.K. Patent Application 2039394A to Fujisawa describing an electronic calculator having an audible sound output.

U.K. Pat. Application 2126 764A to Sinclair describes a hand held portable electronic device for displaying information.

Japanese Pat. Application 51-160476 to Seikosha describes a watch having an audio and a video display.

Although a plethora of technological devices exist which may be able to store, synthesize and otherwise display audio-visual images, none of the above prior art references, taken either singly or in combination, is seen to describe the instant invention as claimed.

SUMMARY OF THE INVENTION

It is, therefore, an object of the present invention to provide an apparatus and method for presenting highly personal thoughts, sentiments, and engrams of persons in the form of a gift to a loved one. The present invention entails presenting a personal gift which imparts a sentiment of the giver to the recipient via an image and an audio message, taking advantage of the prevailing position that gifts of a loved one are the most highly cherished, thereby creating a highly personal gift to the recipient. A gift which contains a likeness of the loved one transfers the associated feelings of the loved one and helps retain and remember those feelings. One may also transfer feelings of an occasion or season by combining the personal message with a representative embodiment of the season, for example, a Christmas ornament. However, typically, transferring the photographic image of the donor and personalizing the gift can only be done by having a specialist use expensive means to transfer the image to the gift. The present invention overcomes this problem, suggesting a means using a simple photo transparency, such as a color slide, to project the donor's image onto a screen, either formed in a case of a predetermined theme or onto a wall, thus allowing the donor to simply and easily incorporate his or her own image, and voice, in a personalized way without the need to send out the image for incorporation into the gift.

Accordingly, it is a principal object of the invention to present a gift having an image of a loved one to a recipient of the gift in conjunction with a personalized audio message.

Still another object of the invention is to provide a gift representative of special occasions, such as holidays, to a recipient.

It is another object of the invention to combine a Christmas ornament with a personalized audio and video message from a donor to a gift recipient.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

Similar reference characters denote corresponding features consistently throughout the attached drawings.

DETAILED DESCRIPTION OF THE PREFERRED EMBODIMENTS

The present invention is an audio playback and visual image presentation device for use as a personal gift, wherein the donor gives something of him or herself to a recipient in the form of an audio message from the donor to the recipient in conjunction with a video image of the recipient.

Figure 1:
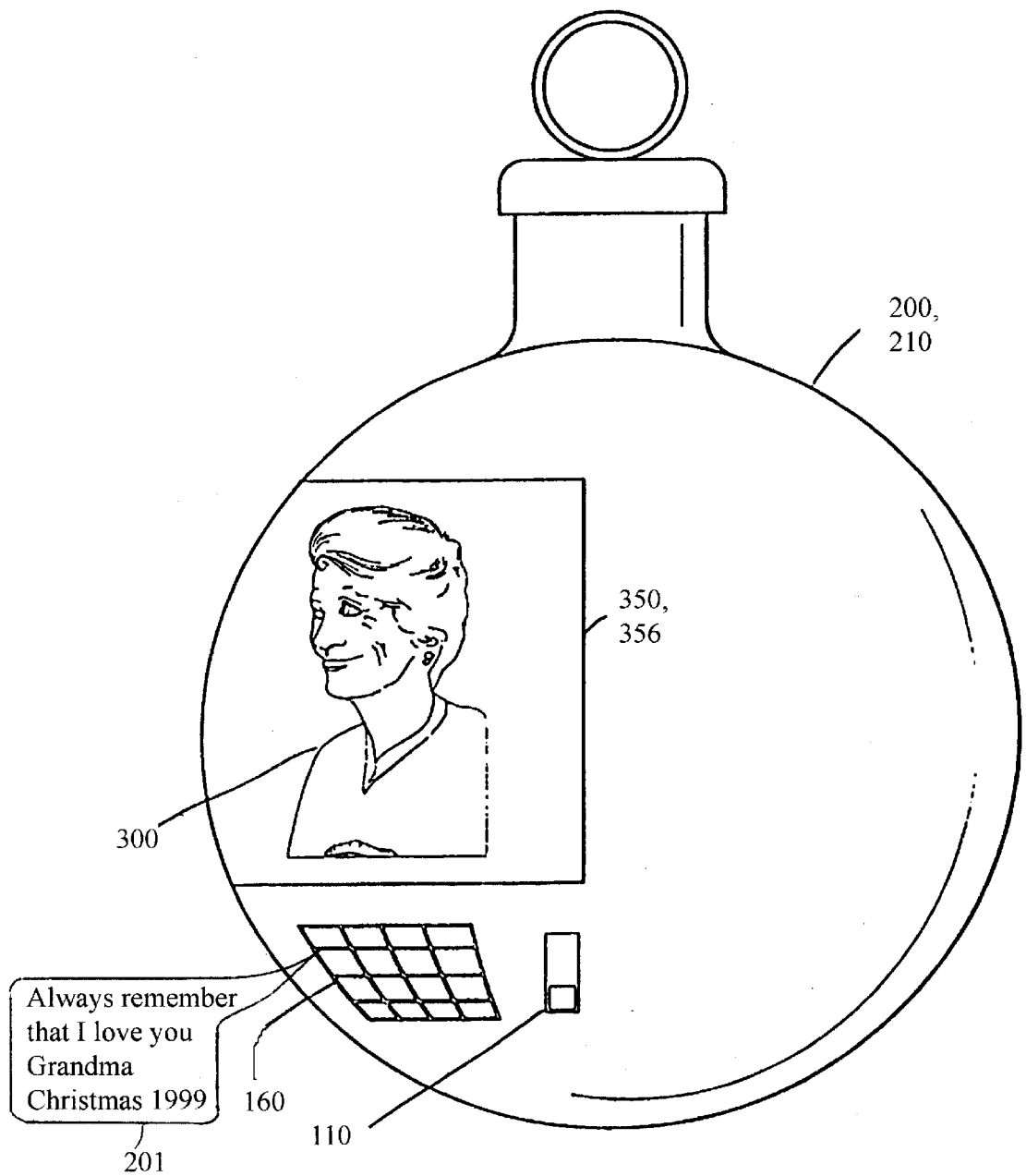
FIG. 1 is a side elevational view of a first embodiment, namely, an ornamental bulb, having a projected image of a loved one with personalized audio message.
Figure 2:
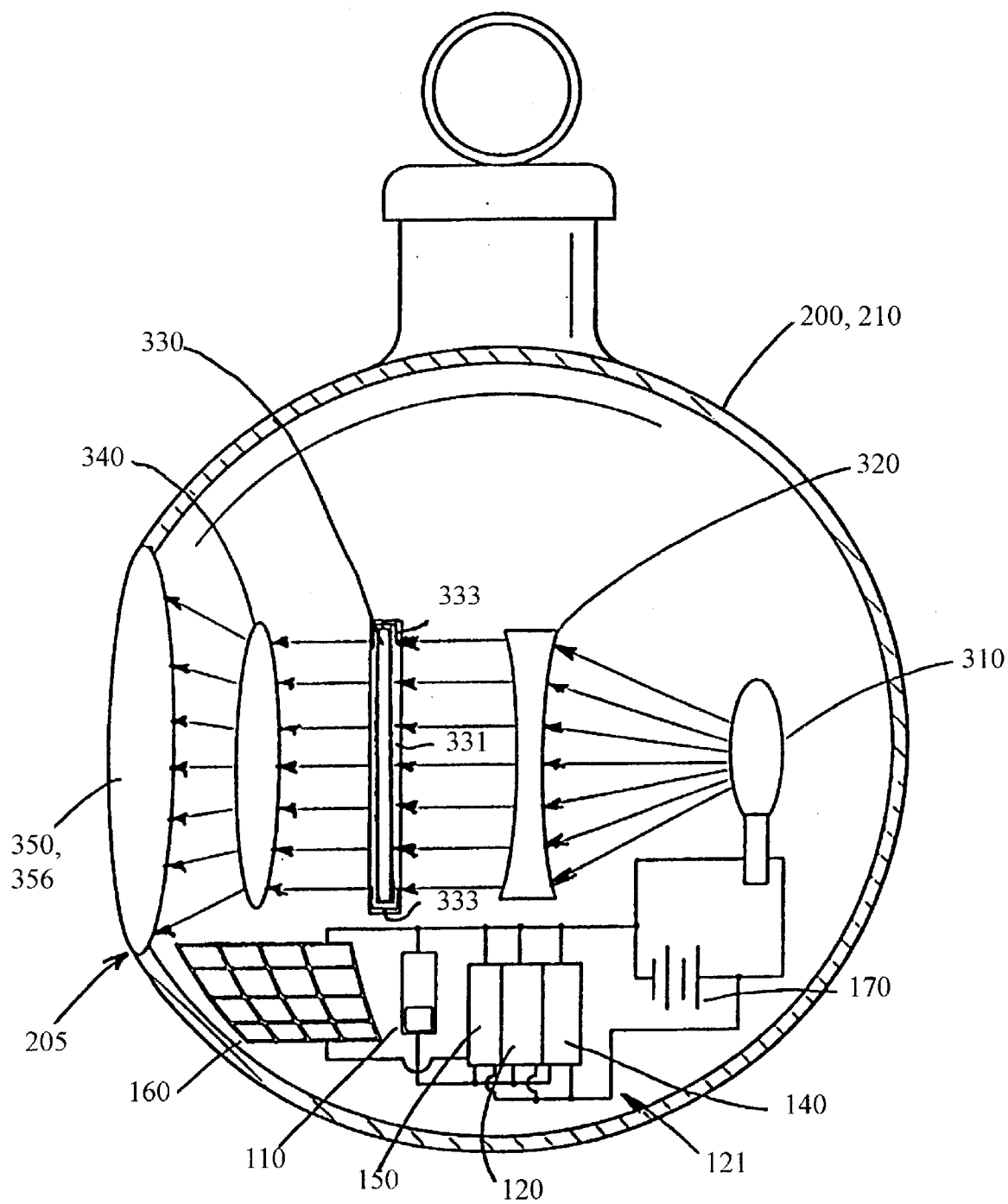
FIG. 2 is a side cross sectional view of a bulb with projection lamp, lenses, slide, and audio playback device.
Figure 3:
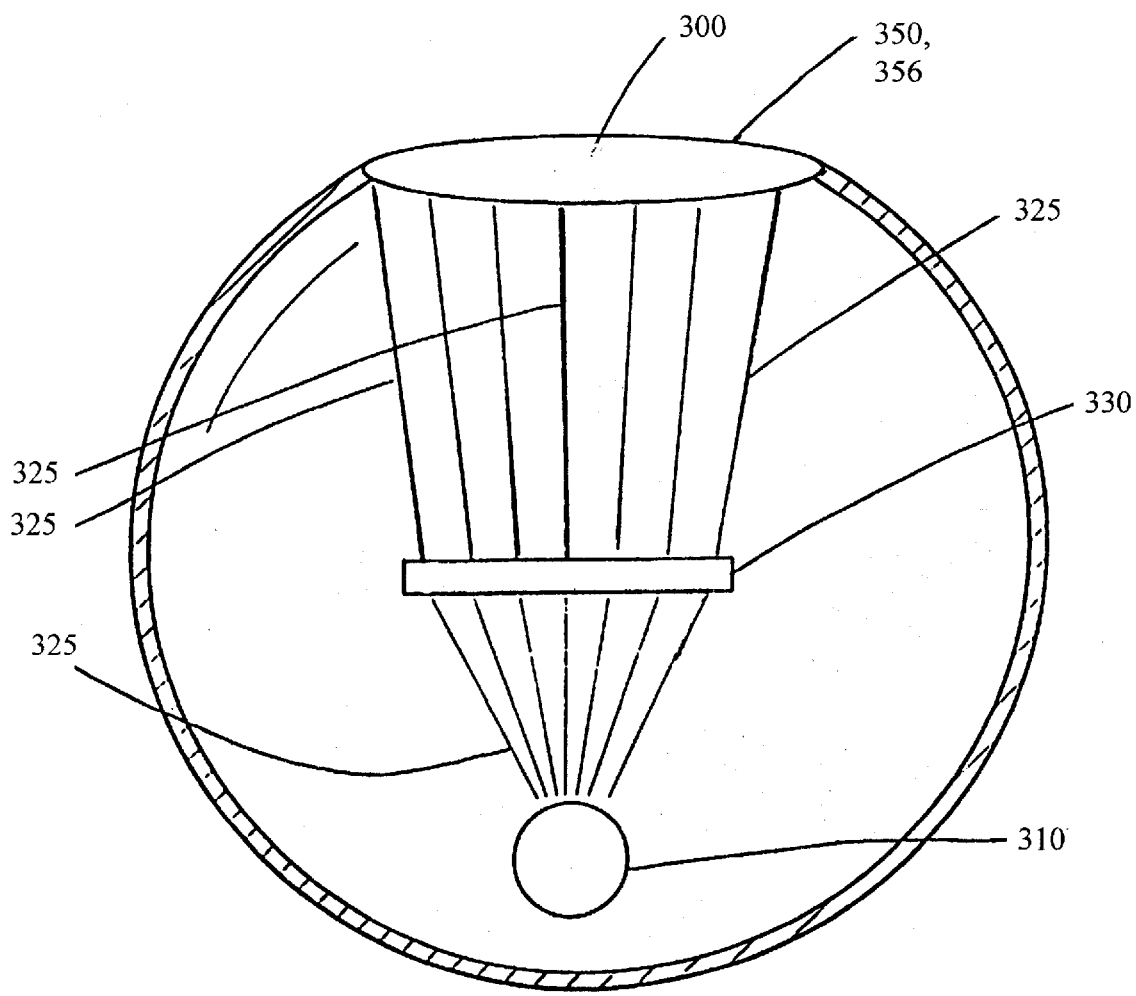
FIG. 3 is a side cross sectional view of an ornamental bulb with a projected image on side of case.
Figure 4:
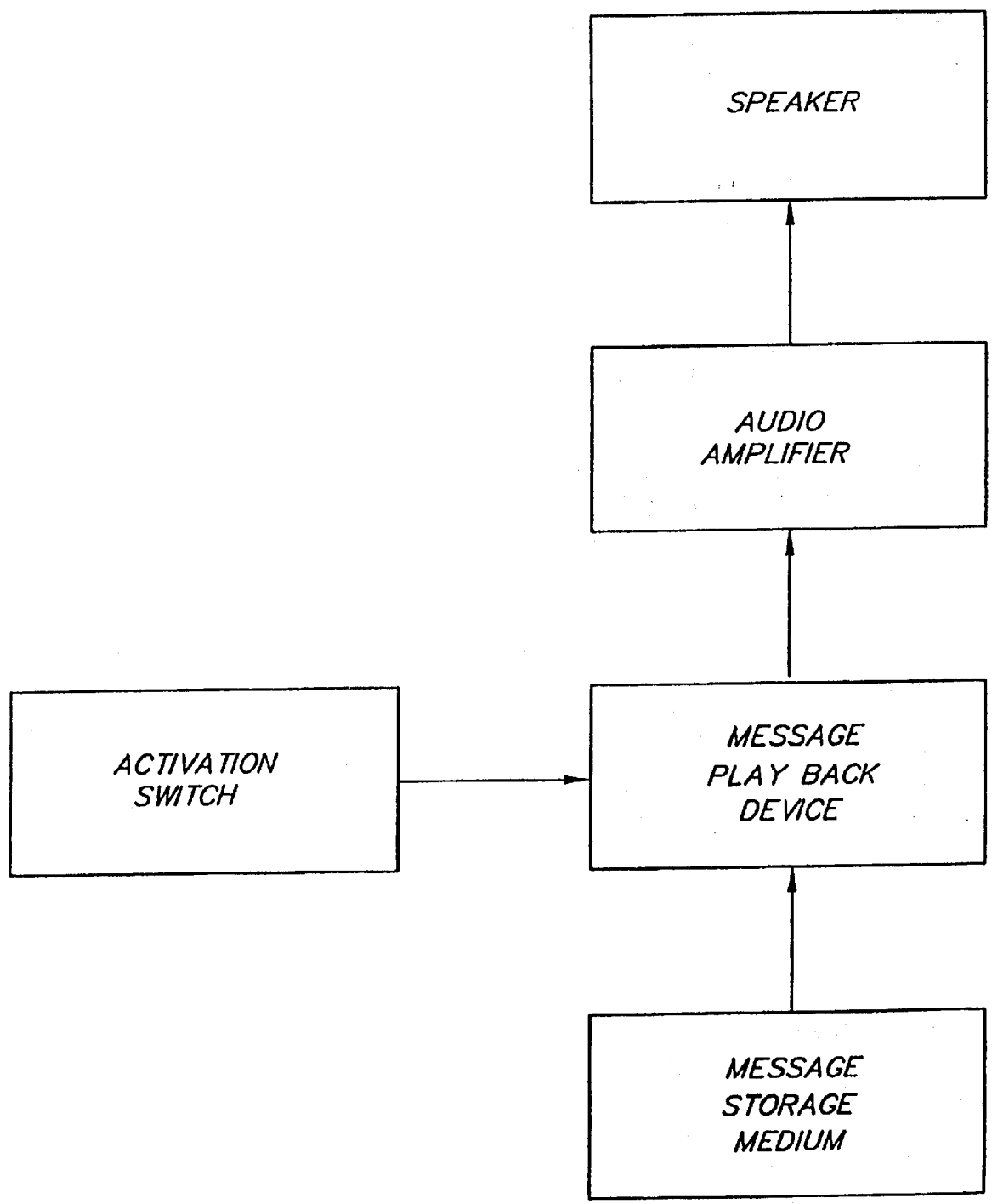
FIG. 4 is a block diagram of audio playback system.
Figure 5:
FIG. 5 is a front elevational view of a second embodiment, namely, a photo frame housing with recorded playback.
Figure 6:
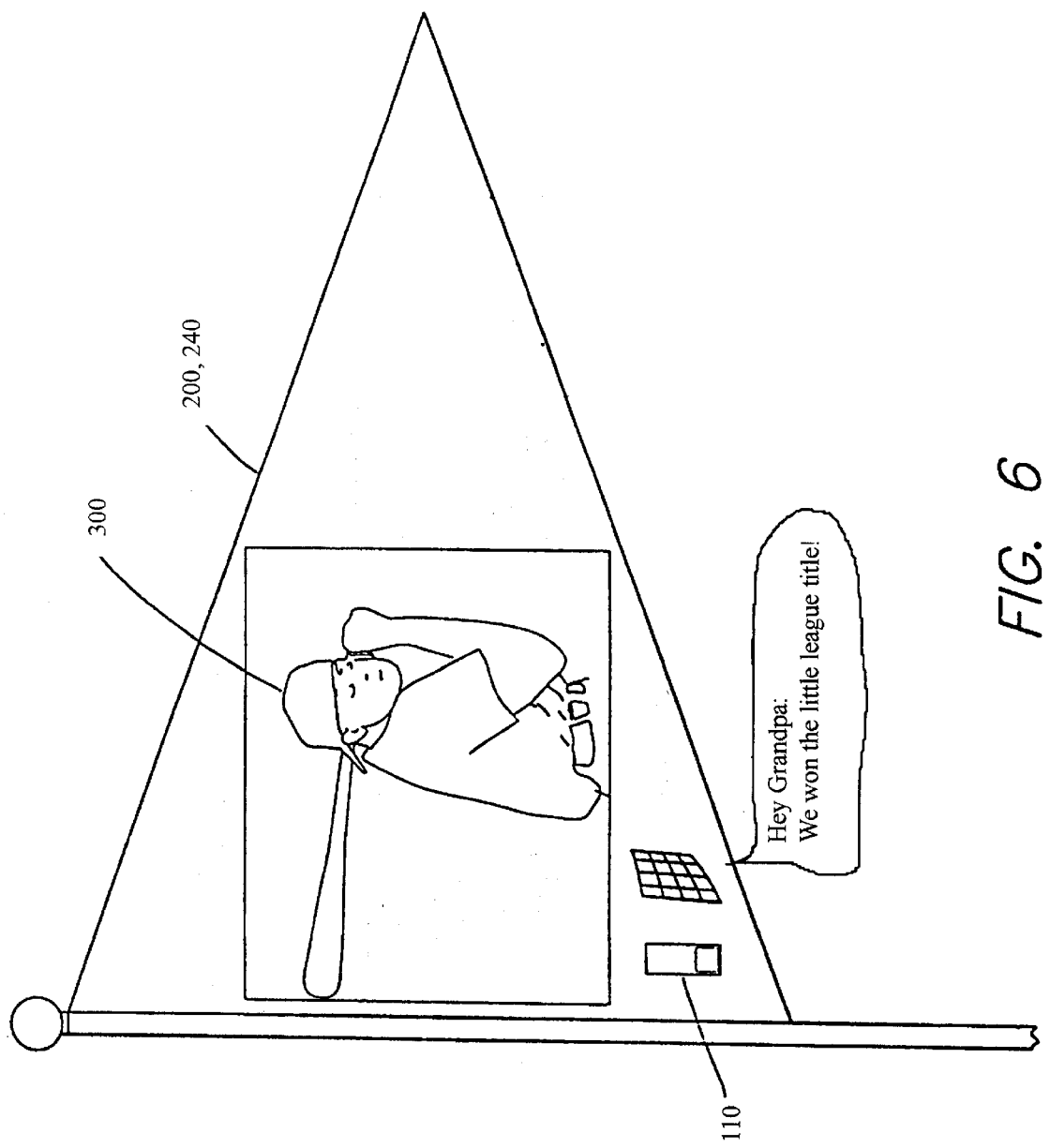
FIG. 6 is a front elevational view of a third embodiment, namely, a picture and message enunciating system housed in a pennant.
Figure 7:
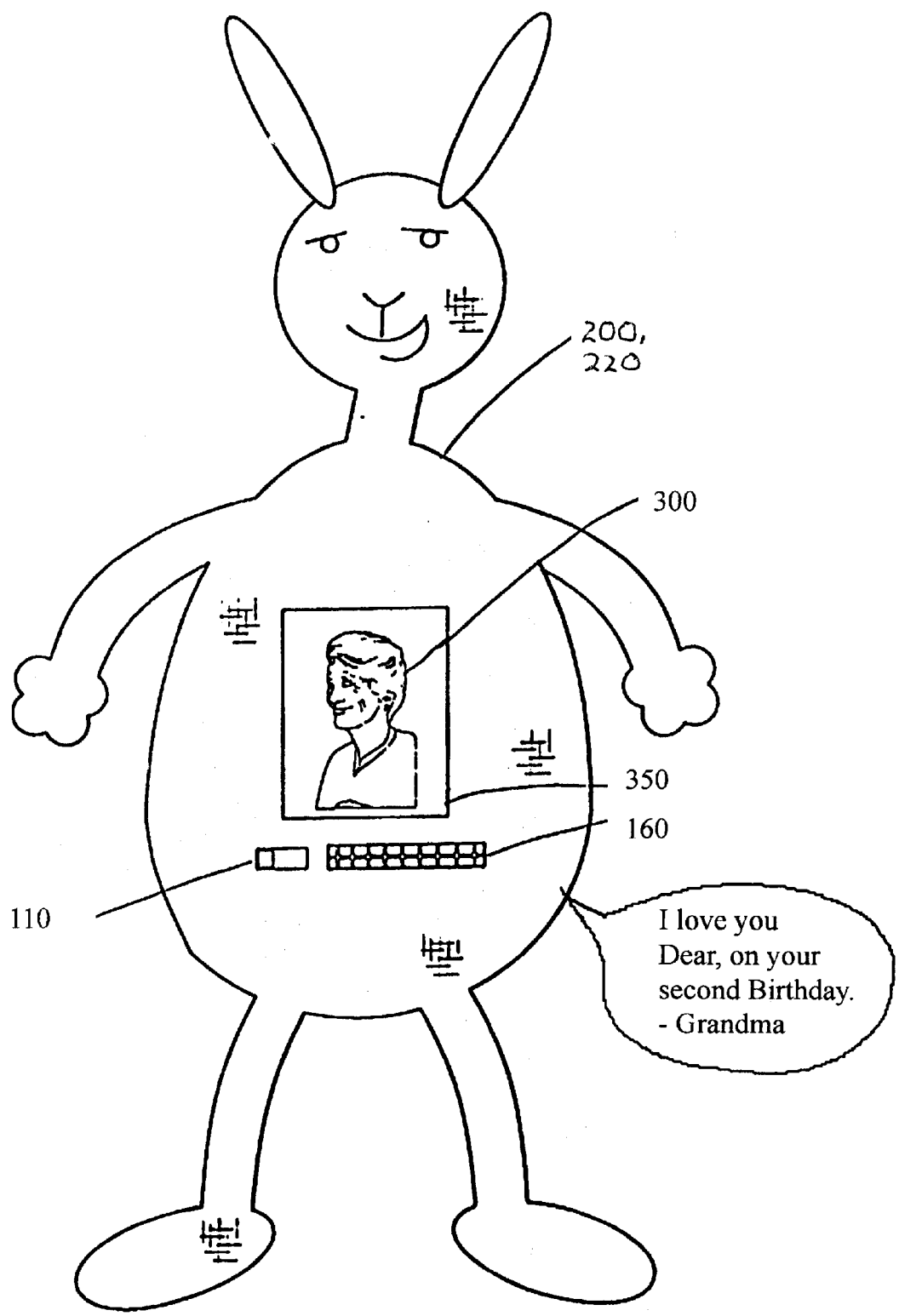
FIG. 7 is a front elevational view of a fourth embodiment, namely an Easter toy.

As shown in FIG. 1 and FIG. 2, a first embodiment is shown comprising a case 200, with a screen 356, an audio speaker 160, and an activation switch 110. The case 200 may take on the form of a Christmas bulb 210, which takes on the added symbolism of the associated holiday, when family and friends are often together and hence the occasion and the engrams mutually reinforce the concept. However, as shown in the additional Figures, the case 200, may be any of a number of items which are commonly passed on as gifts. Such items include, for example, toy rabbits 220 (FIG. 7), picture frames 230 (FIG. 5), pennants 240 (FIG. 6), pendants 250 (FIG. 10), jewelry, ties, kerchiefs, sports trophies, coffee cups, cards, music or jewelry boxes, pens, watches, knickknacks, vases, valentine cards 260 (FIG. 11), or gag gifts. A gift which passes on sentiments of the occasion will reinforce the association. A gift of an object which will continuously keep the loved one in sight will ideally reinforce the association. Alternatively, as suggested by FIG. 6, an event or occasion may also take on such significance. A reminder of the event may be obtained with audio messages and video images of such events, such as a sports championship commemorated through a trophy having these reminders of teammates, coaches, or honored officials.

The audio message 201 may be pre-recorded by the donor. The message recorded preferably will be of a personal nature, something having a character of the interpersonal nature between the two parties or having a content attributable to the character of the donor, including humorous gags or personal social greetings. As suggested in FIG. 2, the message may be pre-recorded remotely from the case 200, being digitized and downloaded into a Programmable Read Only Memory chip (PROM) 140 (including derivative variations, of PROM's such as EPROM, EEPROM, etc.) in the form of a cartridge, chip, or micro-cassette. The cartridge or chip is then plugged into a circuit board 121 disposed within the case 200. The circuit board 121 includes a speech synthesizer 120 which will convert the digital data stored in the PROM into the appropriate analog signal to generate the simulated speech of the donor. The output of the speech synthesizer 120 chip is sent to the input of an audio amplifier 150. The output of the audio amplifier 150 is sent to the speaker 160. A small battery 170, such as those used in hearing aids, watches, calculators, cameras, tape recorders, etc., may be used to supply power to the components. The audio playing of the message may be activated by an activation switch 110 operably connected to the circuitry board 121, the switch taking the form of a button, a slide switch, a thereto-sensitive switch, an electrostatic-sensitive switch, or a vibration-motion sensing switch.

Figure 8:
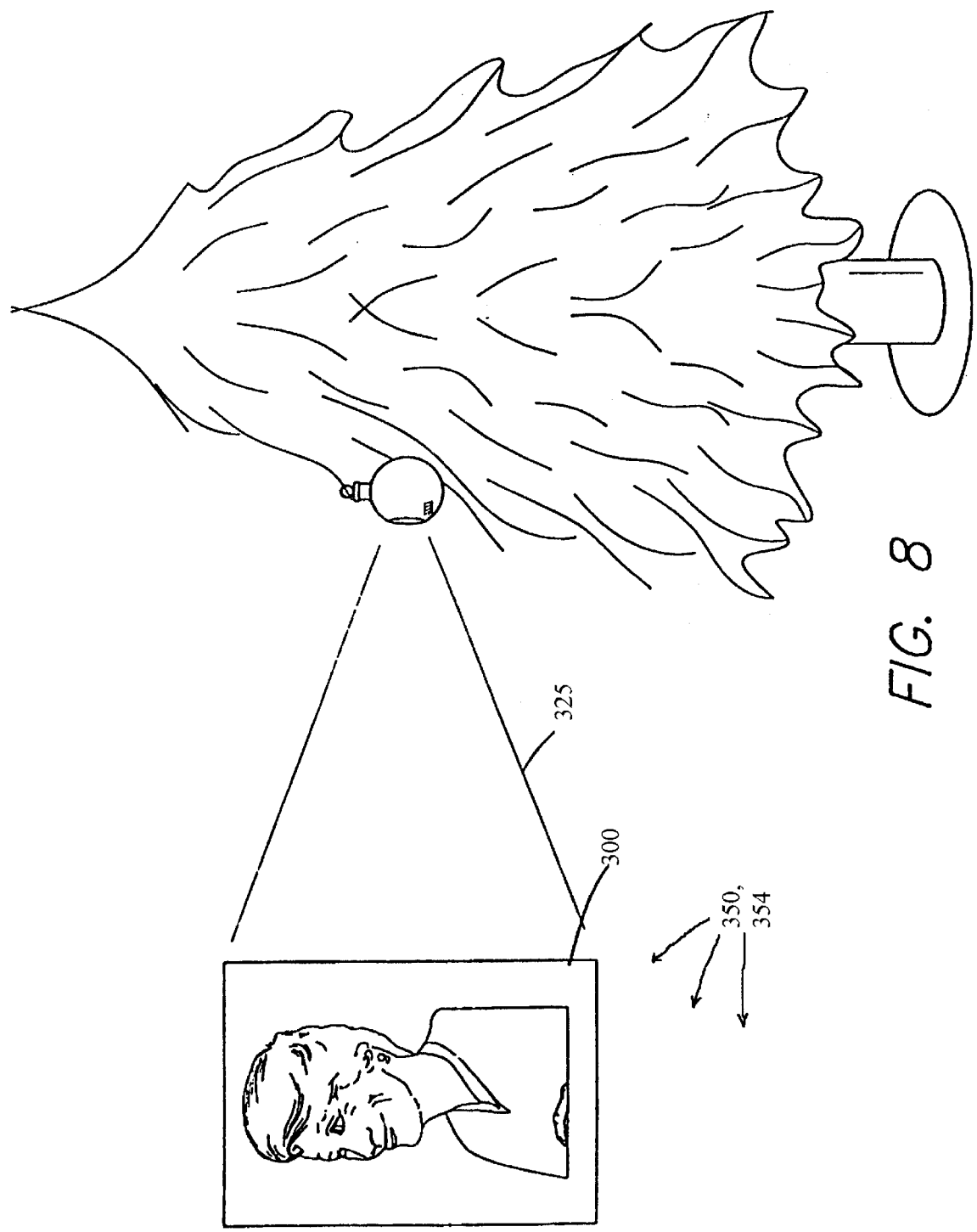
FIG. 8 is a side environmental view of a fifth embodiment employing a projector for projection of an image on a wall.
Figure 9:
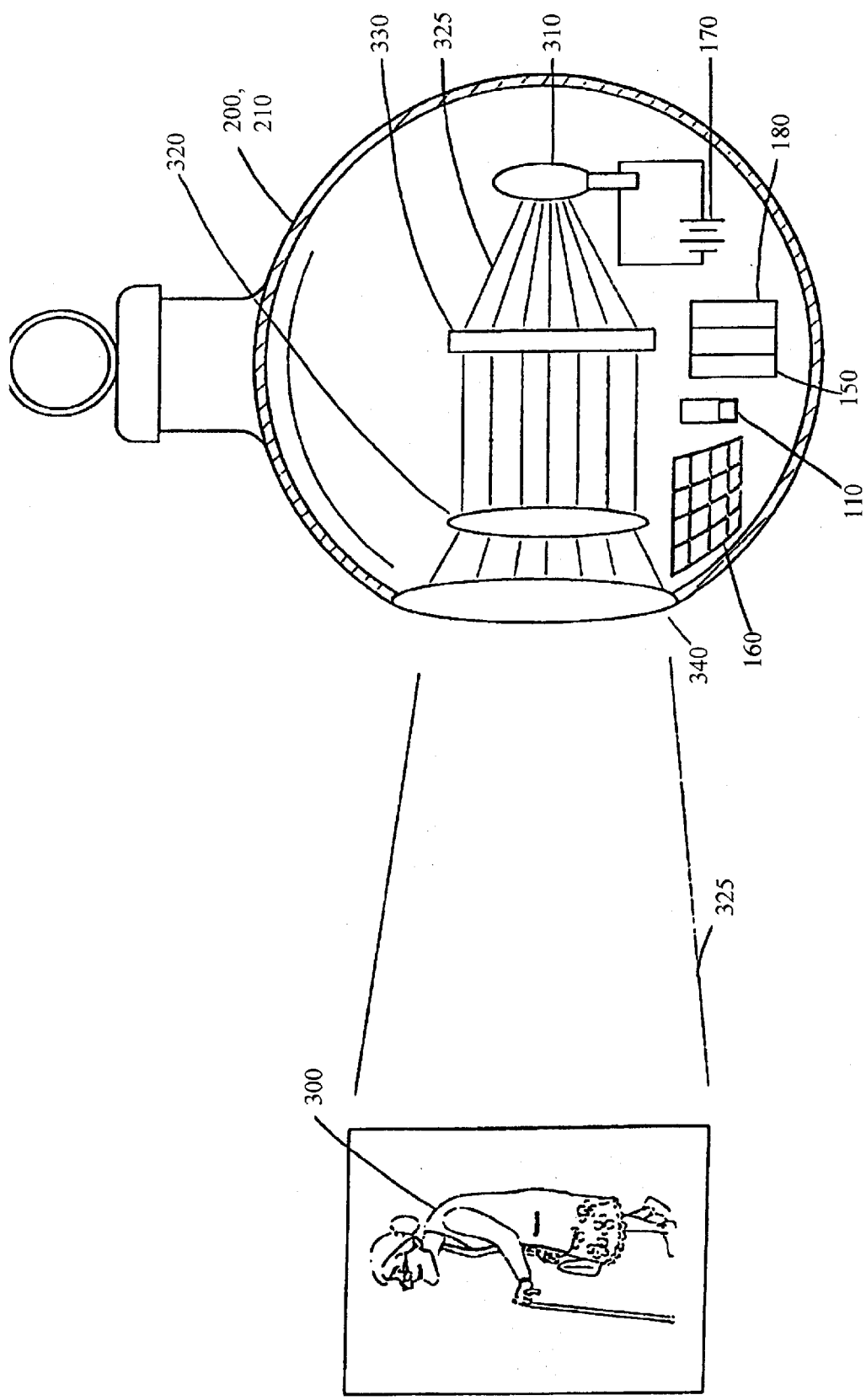
FIG. 9 is a sectional and schematic view showing projection lenses of the fifth embodiment.
Figure 10:
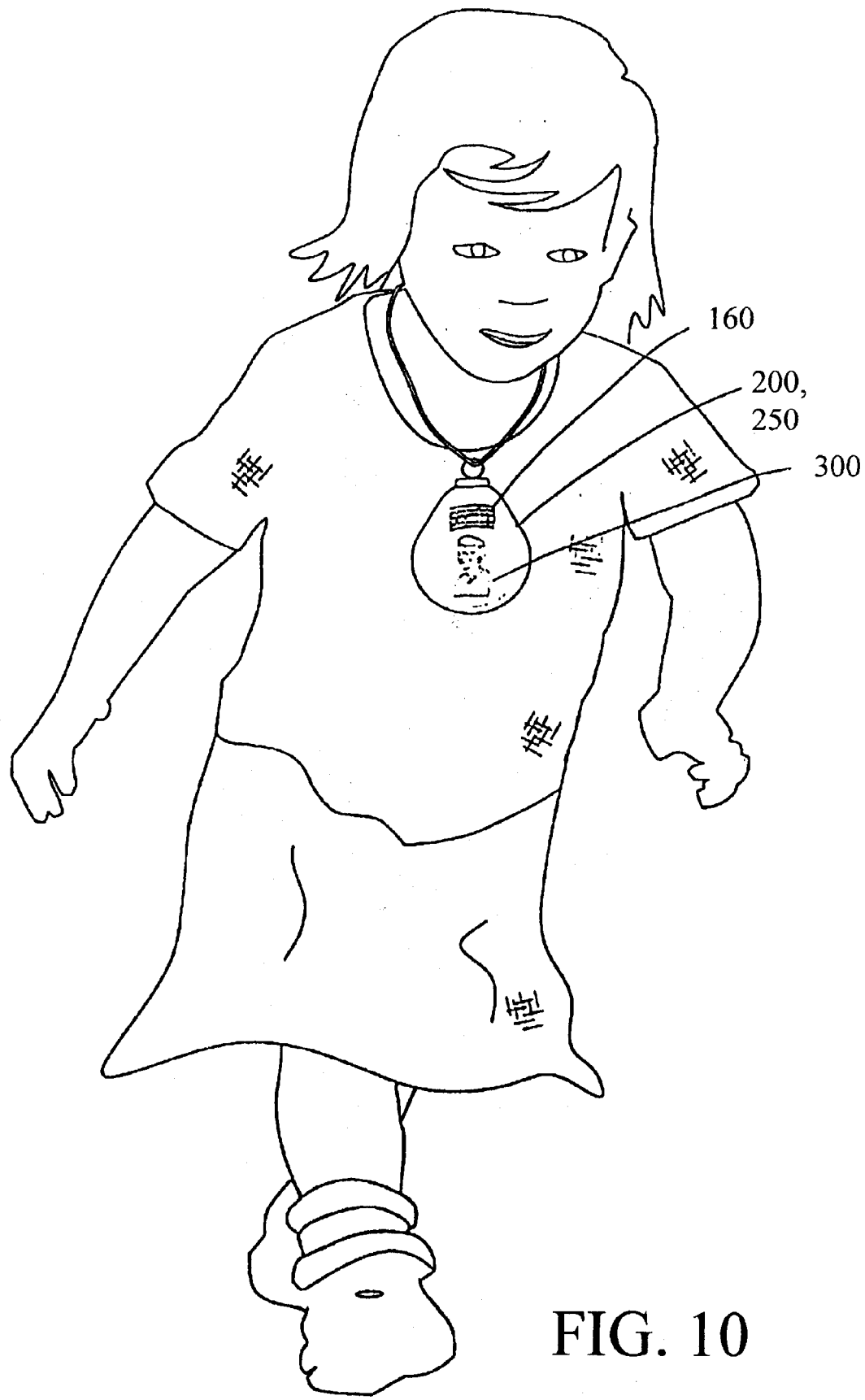
FIG. 10 is an environmental view of a sixth embodiment, namely, a pendant housing an image and message.
Figure 11:
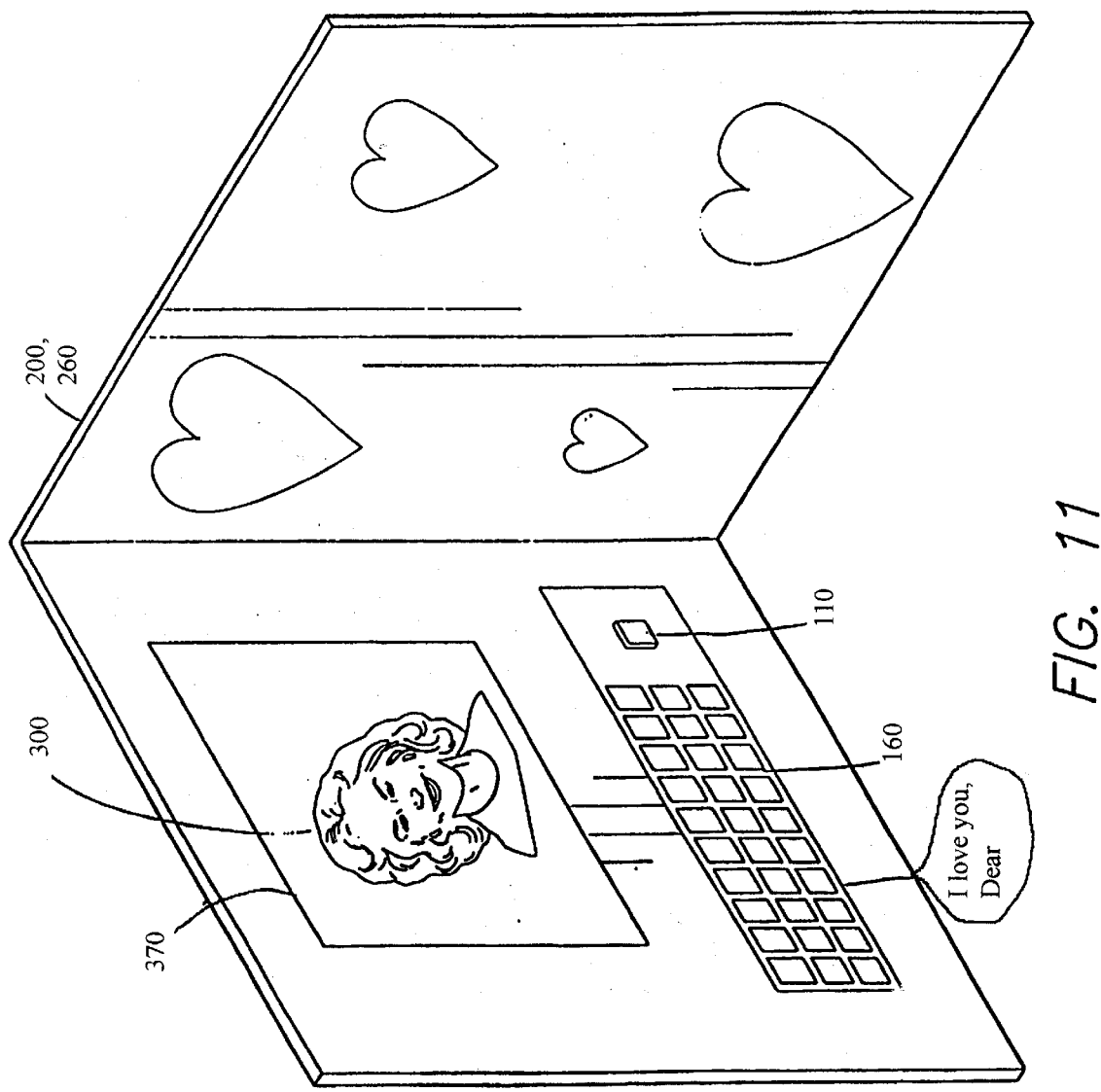
FIG. 11 is a perspective view of a seventh embodiment, wherein the image and message are housed within a Valentine's Day card.

The case 200 has an aperture 205 in the side of the case, either for the placement of a target screen (as suggested by FIG. 1), for the transmission of the projected image outside the case (as suggested by FIG. 8), or for the placement of a slide transparency at the opening (as suggested by FIG. 10). As shown by the first embodiment of FIG. 1, a second aperture or slot 331 is provided for insertion of a slide transparency 330, which resides in a track 333 disposing the transparency in a light path. The image 300 (FIG. 1) would be projected by means of a light source 310 (FIG. 2) emitting light to a concentrator or condenser lens 320, the condenser lens passing the light beam 325 through the slide transparency 330 with the image being sent on to the projection 340 or dispersal lens, before striking a target screen 350.

This screen 350 may be inside of the case 200 or it may be on the outside of the case 200. In the Christmas bulb embodiment, a screen 356 is located on the side of the case 200 formed in the shape of a bulb (FIG. 1). If the target screen 350 is on the surface of the case 200, the screen 350 will need be translucent permitting the image to be viewed from the outside of the case 200. A translucent screen 350 permits an image to be partially transmitted and partially highlighted such that the image 300 is viewable by a person looking at the screen 356 outside the case 200. Under such an arrangement, the image 300 is projected on the inside of the screen 356 and will be mirror imaged with respect to the image viewable on the outside of the screen or case.

If the image is not projected on a translucent screen 356 at the surface of the case 200, it will strike a wall 354 or other opaque target screen 350. With either target screen 350, moving the relative positions of the lenses with respect to the slide 330 image source will provide a means for focusing the image 300 on the appropriately chosen screen. Alternately, a slide 330 could be positioned at the edge of the case 200 for direct viewing of the slide 330, as also suggested in FIG. 10.

In alternative embodiments (not shown), the projected image 330 may be replaced with an image 330 generated on a liquid crystal display (LCD), or on a cathode ray tube (CRT). In other embodiments, the projected image could be replaced with a direct picture. In still other embodiments the image 300 could be replaced with multiple images selectively viewed based upon the viewers angle by the use of fresnel lenses, thereby creating images of multiple positions which could create a perception of movement. In yet another alternative embodiment, an epidiascope type projector may be used wherein, the source image is an opaque object, such as a photograph. In the epidiascope configuration the light source is directed on the object, the light source, condenser and image source are not all in line with one another.

Figure 12:
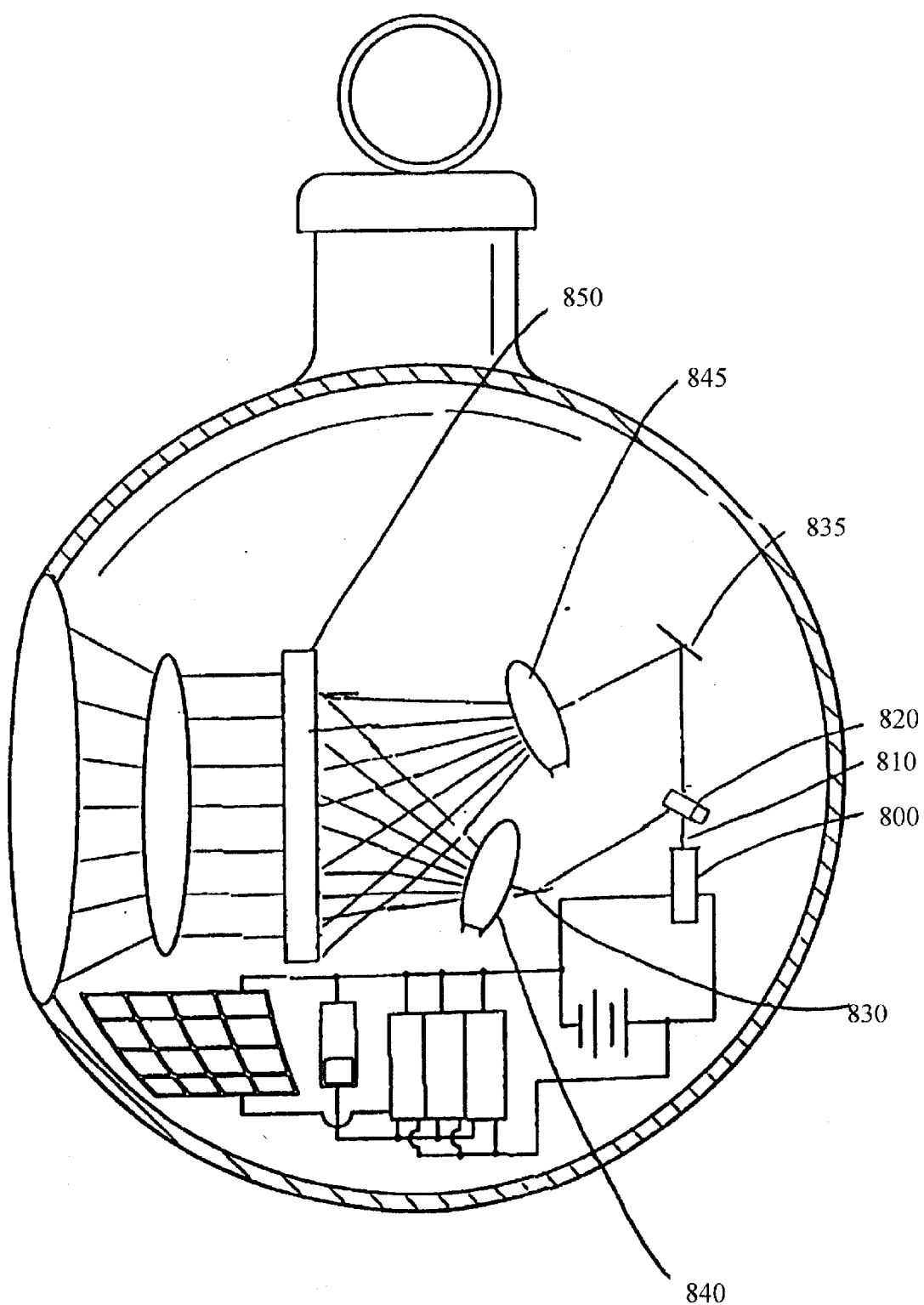
FIG. 12 is a side cross sectional view of a bulb with laser, lenses, slide, and audio playback device.

Alternately and as shown in FIG. 12, the light source may comprise a candle or a laser 800 or the terminal end of a fiber optic line (which in itself would have a light source at the source end of the optical fiber). Laser holography techniques may be used to project an image on a screen. Techniques well known from the field of laser holography may be combined and applied into the present invention. In one of its simplest forms, the holographic image may be made by directing a laser beam 810 through a beam splitter 820, sending the unsplit portion of the beam to a second mirror 835, through a first beam spreading lens 840 on to a high resolution holographic slide image 850 on to a target. The split portion of the beam is directed to a first mirror 830, then on to a second beam spreading lens 845, then to the high resolution holographic slide 850, then on to the target image for recombination with the unsplit portion of the beam.

A plurality of such laser sources, beam splitters, reflective mirrors, and beam spreading lenses may be used in conjunction with the focusing of the spread beams to convergence in three dimensional space for a three dimensional projected image running at the points of the beam convergence.

A donor would typically make a recording of a message intended as an expression of his or her sentiments for the recipient to hear. Digital recordings could be made by converting analog signal to digital using digital to analog converters and then recording the digitized material. The digitized data may be loaded into PROM 140, wherein the PROM may be a subset of the speech synthesizer 120, or a separate chip or a separate cartridge. The discrete chips or cartridges with their prerecorded messages may be plugged into the speech synthesizer. In one embodiment, the audio recording may be made by combining, as an onboard component (within the case), a recording device which stores the auditory message into RAM or tape based storage media as are readily available in miniaturized forms. The construction details of such recorders are well known and are not necessary as it is the combination which is embodied in the invention. Alternately, the donor may record the message at a remote location such as a remote dedicated sound booth onto a micro-cassette 180 or cassette which is then inserted in the playback unit of the memento. In alternative embodiments of storing images, the donor takes a video image 300 of himself or herself, processes it in such a way as to make storable in some storage medium such a photographs, slide, binary file, etc. The donor then places the slide or other storage medium within the case 200 or on the side aperture 205 of the case 200, whichever means being appropriate for the specific embodiment.

Alternatively, a video image made by incorporating as an onboard component (within the case) a video camera having storage and playback capability, such cameras being readily available in the market. The construction details of such cameras are not explained as it is the combination which is embodied in the invention. The camera may capture the image through a visually transparent aperture in the case.

It is to be understood that the present invention is not limited to the sole embodiments described above, but encompasses any and all embodiments within the scope of the following claims. For instance, the size and shape of the present invention may be easily adapted for use as a wall or door attachment to serve as a front door greeting or the like, or any other fixture where an audio/video message from the donor to the recipient is appropriate.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

I claim:

1. An apparatus for presenting personal engrams comprising:
   a case;
   an audio playback means disposed within said case, said audio playback means containing a personalized audio message from a gift donor to a gift recipient; and
   display means for displaying an image of said gift donor on an external surface of said case.

2. The apparatus for presenting personal engrams according to claim 1 wherein said case comprises the shape of a bulb forming a Christmas ornament.

3. The apparatus for presenting personal engrams according to claim 1 wherein:
   said audio playback means comprises a speech synthesizer; and
   said personalized message is stored in a digital memory storage device accessible by said speech synthesizer.

4. The apparatus for presenting personal engrams according to claim 3 wherein said digital memory storage device comprises a PROM chip.

5. The apparatus for presenting personal engrams according to claim 1 wherein said display means is a projected image on a translucent target screen, said translucent target screen defining a part of an external surface of said case.

6. The apparatus for presenting personal engrams according to claim 5 further comprising at least one lens and a light source, said light source is selected from the group composed of a lamp, a laser, a candle, and at least one optical fiber.

7. The apparatus for presenting personal engrams according to claim 1 wherein said display means is a photograph defining a part of an external surface of said case.

8. The apparatus for presenting personal engrams according to claim 1 wherein said display means is a liquid crystal display defining a part of an external surface of said case.

9. The apparatus for presenting personal engrams according to claim 1 wherein said display means is a slide defining a part of an external surface of said case, wherein said case further includes a light source for illuminating said slide.

10. A system for presenting personal engrams to a gift recipient comprising:
    means for recording a personalized audio message accompanied by visual images;
    a case;
    audio message and visual image playback means contained within said case, said audio message and visual image playback means containing a personalized audio/visual message from a gift donor to said gift recipient; and
    a viewable image of said gift donor on an external surface of said case.

11. The system for presenting personal engrams to a gift recipient according to claim 10 wherein:
said case is shaped as a Christmas bulb;
said means for recording a personalized audio message accompanied by visual images is contained within said case;
said audio message playback means comprises a speech synthesizer; and
said personalized audio/visual message is stored in a digital memory storage device accessible by said speech synthesizer.

12. The system for presenting personal engrams to a gift recipient according to claim 10 wherein said viewable image of said gift donor is a projected image on a translucent target screen, said translucent target screen defining a part of an external surface of said case.

13. The system for presenting personal engrams to a gift recipient according to claim 10 wherein said viewable image of said gift donor is a photograph defining a part of an external surface of said case.

14. The system for presenting personal engrams to a gift recipient according to claim 10 wherein said viewable image of said gift donor is a liquid crystal display defining a part of an external surface of said case.

15. The system for presenting personal engrams to a gift recipient according to claim 10 wherein said viewable image of said gift donor is a slide defining a part of an external surface of said case, wherein said case further includes a light source for illuminating said slide.

16. A method for a gift donor to present a personalized message to a gift recipient, comprising the steps of:
said gift donor giving said recipient a gift apparatus;
displaying a viewable image of the gift donor on an external surface of the gift apparatus; and
playing a recording of an audio message from said gift donor.

17. The method for presenting a personalized message to a gift recipient according to claim 6 wherein said step of displaying a viewable image comprises projecting a slide image of said gift donor onto a translucent target screen defining a part of said external surface of said apparatus.

18. The method for presenting a personalized message to a gift recipient according to claim 17, wherein said step of projecting a slide image of said gift donor further comprises:
creating a concentrated beam of light with a condenser lens;
directing said beam of light through said slide image to a projecting lens; and
directing said beam of light through said projecting lens onto a translucent target screen.

19. The method for presenting a personalized message to a gift recipient according to claim 16 wherein said viewable image is a series of video images displayed by a video camera contained within said apparatus.

* * * * *